Patented Oct. 20, 1953

2,656,318

UNITED STATES PATENT OFFICE 2,656,318

MINERAL OIL ADDITIVE

Jeffrey H. Bartlett, Westfield, N. J., assignor to Standard Oil Development Company, a corporation of Delaware No Drawing. Application December 31, 1949, Serial No. 136,393

19 Claims. (Cl. 252—46.6)

This invention relates to lubricating oil additives and particularly to lubricating oil additives of the multifunctional type.

Modern developments in the design of internal combustion engines, with increasing engine speeds and compression ratios, have imposed a severe strain on the lubricants employed. In particular, the crankcase oil in the course of its circulation through the engine is rapidly exposed to air under conditions highly conducive to destructive oxidation. Oxidative breakdown of the oil results in the formation of acidic products which corrode bearing surfaces and do considerable harm to the engine generally. Furthermore, the metallic corrosion products have the effect of catalyzing further oxidative breakdown of the oil.

It is also known that in modern internal combustion engines, such as in automotive and in aviation gasoline engines operating at relatively high temperatures or in high speed diesel engines, piston rings have a tendency to become stuck in grooves. Lacquer and carbon formation appear to be the principal reasons for this occurrence. Moreover, scuffing of top lands due to the formation of hard carbon may cause serious damage to the engine.

It has been found, in accordance with the present invention, that destructive oxidation of lubricating oils and deposition of carbon and lacquer may both be reduced to a considerable degree by the addition to the oil of a small amount of a new additive, which may be described as the product obtained by reacting a sulfide of phosphorus or other combination of the elements sulfur and phosphorus with a polymeric material obtained by the polymerization of an ester of an $\alpha,\beta$-unsaturated dicarboxylic acid and a long chain monohydric aliphatic alcohol, or by copolymerizing a mixture of such esters or a mixture of such esters with another unsaturated compound, particularly a vinyl ester or vinyl substituted aromatic hydrocarbon. Since the reaction product is of an acidic character, it may be converted into a salt of a metal of group I or II of the periodic table, or a nitrogen base salt, and such salt will be also useful in accordance with the present invention.

The additives thus prepared not only have the effect of reducing oxidation in lubricating oils and the formation of carbon deposits or sludge, but are also useful, when added to lubricants, for the purpose of protecting exposed metallic surfaces against rusting when same are exposed to moisture and humid air. When added to mineral lubricating oils they also have the effect of lowering the pour point and improving the viscosity index of the same. The additives are also useful generally as antioxidants in mineral oil lubricants of all types.

More precisely, the polymeric material which may be reacted with a phosphorus sulfide or other combination of phosphorus and sulfur to form additives in accordance with the present invention may be defined as a polymer of an ester of a dicarboxylic acid which contains a double bond in the position $\alpha,\beta$ to one of the carboxyl groups and contains a total of two to four carbon atoms, exclusive of the carboxyl groups, such ester having as esterifying groups aliphatic hydrocarbon radicals, saturated or unsaturated, each containing 6 to 22 carbon atoms, the average number of carbon atoms in the two radicals being 8 to 18, or a copolymer of an ester so defined and a vinyl compound of the formula

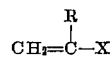

where R is hydrogen or a methyl group, and where X is an acid radical R'COO— (R' is an alkyl group, $C_2$ to $C_{18}$) or aromatic hydrocarbon radical which may contain one or more alkyl side chains of 1 to 4 carbon atoms each, provided that the mixture from which such copolymer is prepared contains at least 25%, on a molecular basis, of one or more dibasic acid esters as defined above.

Among the most useful members of the series of acids employed in forming the above-defined esters may be mentioned maleic acid, fumaric acid, glutaconic acid, itaconic acid, citraconic acid, mesaconic acid, $\alpha$-methylenemalonic acid, $\alpha$-methyleneglutaric acid, and homologous compounds.

The alcohols which may be employed to esterify the above described acids, in accordance with this invention, are saturated or unsaturated monohydric aliphatic alcohols or mixtures thereof. These include, among the saturated alcohols, compounds such as n-hexyl alcohol, n-octyl alcohol, tert.-octyl alcohol, 2-ethylhexyl alcohol, n-dodecyl alcohol, a commercial mixture of $C_{10}$ to $C_{18}$ primary alcohols derived from cocoanut oil and known as "Lorol B" alcohol, and the like. Unsaturated alcohols include alcohols of the type of allyl alcohol, methallyl alcohol, crotyl alcohol, oleyl alcohol, and the like.

It has been stated above that copolymers of mixtures of esters of $\alpha,\beta$-unsaturated dicarboxylic acids of the type defined above with vinyl esters or vinyl aromatic hydrocarbons may be employed in the reaction with a sulfide of phosphorus. Conveniently obtainable compounds which are suitable for copolymerization with the dibasic acid esters are, for example, vinyl acetate, vinyl propionate, vinyl butyrate, vinyl oleate, vinyl stearate, isopropenyl acetate, styrene, α-methylstyrene, vinyl naphthalene, and the like.

The polymers and copolymers of the above described esters or mixtures of esters with vinyl compounds which are to be reacted with phosphorus and sulfur in accordance with the present invention may be of molecular weights ranging from about 1,000 to about 50,000, but the more preferred range is from about 2,000 to about 20,000. Such polymers may be produced by well-known polymerizing processes, using peroxide type catalysts such as benzoyl peroxide, lauroyl peroxide, cumene hydroperoxide, tert.-butyl hydroperoxide, and the like. Redox type peroxide systems may also be used. Friedel-Crafts type catalysts or clay may also be used. Mass polymerization or emulsion polymerization techniques are suitable.

The polymerized esters derived from the alcohols and acids described above are reacted with a combination of the elements sulfur and phosphorus. It is preferable to employ a sulfide of phosphorus, such as $P_2S_3$, $P_2S_5$, $P_4S_3$, or $P_4S_7$, or mixtures thereof, but mixtures of elemental sulfur and elemental phosphorus may likewise be employed, in which case it is preferable to employ powdered sulfur and white phosphorus. Likewise, a mixture of one or more sulfides of phosphorus and elemental sulfur and/or elemental phosphorus may be employed. The amounts of sulfur and phosphorus which are advantageously employed depend upon the number of ester groups and the oil solubility of the product, and it is preferred to react from 1 to 25% by weight of the phosphorus-sulfur combination, relative to the weight of the polymer, and the atomic ratio of phosphorus to sulfur should be from 1:1 to 1:30. In general, the higher proportions of phosphorus and sulfur or sulfide of phosphorus may be employed when the ester molecule contains long chain hydrocarbon oil-solubilizing groups. In general, the temperature at which the reaction of the sulfide of phosphorus or mixture of sulfur and phosphorus with the ester is carried out is from 200 to 500° F., and the time required to substantially complete the reaction is generally from 1 to 10 hours. It is generally desirable to employ a solvent for the polymer or copolymer, in which case the solvent should be relatively inert to phosphorus and sulfur. Such solvents include, for example, benzene, o-dichlorbenzene, mineral oils, and the like. In preparing an additive for a mineral oil, it is usually convenient to employ such a mineral oil as the medium for the reaction, and thus prepare a concentrate for convenient use in blending with the oil.

As stated above, the reaction products prepared as described may be employed as such or in the form of their metal salts. The metals employed are preferably group II metals and the calcium and barium salts are particularly desirable and convenient to prepare. Such metal salts may be conveniently prepared by reacting the phosphorus and sulfur reaction product with metallic oxides or hydroxides. Such metallic compounds may be added to the reaction mixture in which the phosphorus and sulfur reaction products are formed, and the mixture heated to a temperature of the range of 50–400° F.

The additives of the present invention are preferably added to mineral oils in proportions ranging from 0.01% to 15% by weight, the proportion being preferably about 1.0 to 5.0% when employed as corrosion inhibitors and detergents in mineral lubricating oils. The proportions giving the best results will vary somewhat according to the nature of the additive and the specific quality characteristics of the oil to be improved by the use of the additive. For commercial purposes, when the additives are to be employed in mineral lubricating oils, it is convenient to prepare concentrated oil solutions in which the amount of additive in the compositions ranges from 25 to 50% by weight, and to transport and store them in such form. In preparing lubricating oil compositions for use as crankcase lubricants, the additive concentrate is merely blended with the base oil in the required amount.

Below are given detailed descriptions of preparations of several examples of mineral oil additives of the type described above as well as various laboratory tests which were applied to determine their effectiveness when employed in lubricating oil compositions. It is to be understood that these examples are given to illustrate the present invention and are not to be construed as limiting the scope thereof in any way.

*Example 1*

100 g. of an oleyl-"Lorol B" fumarate copolymer of about 2000 molecular weight (corresponding to 0.18 mol of monomer), prepared by polymerizing equal weights of oleyl fumarate and "Lorol B" fumarate at 70° C. with 1% benzoyl peroxide catalyst, and 163.5 g. of an extracted Mid-Continent neutral distillate oil of 44.1 seconds viscosity Saybolt at 210° F. were charged into a 1-liter, 3-necked flask equipped with stirrer, thermometer and nitrogen inlet tube. After heating to 250° F., 9 g. (0.04 mol) of $P_2S_5$ was added gradually during 30 minutes and the temperature was raised to 300° F. and maintained at this point for 3 hours. The product was a dark reddish oily liquid containing 2.35% sulfur and 0.97% phosphorus, and having a neutralization number of 22.7.

*Example 2*

A preparation was carried out according to the method of Example 1, using the following materials: 100 g. oleyl itaconate polymer of about 3000 molecular weight (0.16 mol monomer), 170 g. of the mineral oil employed in Example 1, 13.2 g. (0.06 mol) of $P_2S_5$. The product was a reddish liquid containing 2.17% sulfur and 0.82% phosphorus, and having a neutralization number of 15.6.

*Example 3*

A 1-liter, 4-necked flask, equipped with stirrer, thermometer, and nitrogen inlet tube was charged with 166.8 g. of the mineral oil employed in Example 1 and 100 g. (0.2 mol) of "Lorol B" fumarate polymer prepared by heating the "Lorol B" fumarate with 1% benzoyl peroxide at 80° C. for 8 hours. After heating the mixture of polymer and mineral oil to 250° F., 11.2 g. (0.05 mol) of $P_2S_5$ was added during 30 minutes. The temperature was then raised to 300° F. and maintained at 300–325° F. for 4 hours, after which the product was filtered through a filter aid known as Celite.

The product was a reddish oil containing 0.89% phosphorus and 2.83% sulfur.

Example 4

A copolymer of "Lorol B" maleate and vinyl acetate was prepared by heating a mixture of 360 g. (0.73 mol) of "Lorol B" maleate, 90 g. (1.05 mol) of vinyl acetate, 150 g. of an extracted Coastal distillate of 37 seconds viscosity Saybolt at 210° F., 6.75 g. of benzoyl peroxide at 70° C. for 30 hours. A 1-liter, 4-necked flask was charged with 133.3 g. of this copolymer (about 8000 molecular weight), corresponding to about 0.16 mol of "Lorol B" maleate monomer, dissolved in the mineral oil employed in its preparation (75% concentration) and 137.0 g. of the mineral oil employed in Example 1. This mixture was treated with 13.5 g. (0.06 mol) $P_2S_5$ under the conditions employed in Example 3. The product, after filtration through Celite, was found to contain 1.45% phosphorus and 3.19% sulfur.

Example 5

A copolymer of "Lorol B" fumarate and styrene was prepared by heating a mixture of 248 g. (0.50 mol) of "Lorol B" fumarate and 52 g. (0.50 mol) of styrene in 32.5 cc. of n-heptane with 3.0 g. of benzoyl peroxide at 70° C. for 19 hours. The resulting polymer of about 8000 molecular weight was dissolved in a solvent extracted Mid-Continent oil to make a 40% concentrate after removal of the heptane. A 1-liter 4-neck flask was charged with 250 g. of the above copolymer in oil and 20.9 g. of an extracted Mid-Continent neutral oil. This mixture was treated with 13.9 g. of $P_2S_5$ under the conditions employed in Example 3. The filtered product, considered as a 40% concentrate, was found to contain 1.55% phosphorus and 3.89% sulfur.

Example 6.—Laboratory bearing corrosion test

Blends were made of the products (which contained a sufficient amount of mineral oil to provide a 40% by weight concentrate of the active ingredient) of Examples 1 to 5, inclusive, in a lubricating oil base consisting of a blend of 92% by volume of a Mid-Continent neutral oil and 8% by volume of a bright stock, the blend having been solvent extracted to produce an oil of SAE 20 grade. Each blend contained 0.25% of the active ingredient. These blends and a sample of the unblended base oil were submitted to a corrosion test designed to demonstate the effectiveness of the additive in inhibiting corrosion of a typical copper-lead bearing.

In this test 500 cc. of the oil was placed in a glass oxidation tube (13" long and 2⅝" in diameter), fitted at the bottom with a ¼" air inlet tube perforated to facilitate air distribution. The oxidation tube was then immersed in a heating bath so that the oil temperature was maintained at 325° F. Two quarter sections of automotive bearings of copper-lead alloy of known weight and having a total area of 25 sq. cm. were attached to opposite sides of a stainless steel rod which was then immersed in the test oil and rotated at 600 R. P. M. thus providing sufficient agitation of the sample during the test. Air was then blown through the oil at the rate of 2 cu. ft. per hour. At the end of each four-hour period the bearings were removed, washed with naphtha and weighed to determine the amount of loss by corrosion. The bearings were then repolished (to increase the severity of the test), reweighed, and then subjected to the test for additional four-hour periods in like manner. The results are shown in Table I below as "corrosion life," which indicates the number of hours required for the bearings to lose 100 mg. in weight, determined by interpolation of the data obtained in the various periods.

Example 7.—Copper strip test

Each of the products of Examples 1 to 5 was blended in a lubricating oil base consisting of a solvent extracted Mid-Continent neutral distillate of 44.1 seconds viscosity Saybolt at 210° F., in an amount sufficient to form a blend containing 0.75% of active ingredient. These blends and a sample of the unblended base oil were submitted to a copper strip test which was a modification of the C. R. C. method L–16–445. This method comprises immersing a polished metallic copper strip in the oil blend to be tested for periods of ½ and 3 hours at 212° F. and noting the extent of staining. Numerical ratings from 1 to 10 denote discoloration ranging from no stain to a black surface film respectively.

The results of the test described in Examples 6 and 7 are given in Table I, which follows:

TABLE I

| Additive Preparation | Ester or Ester Mixture Polymerized and Treated with $P_2S_5$ | Mol Ratio $P_2S_5$/ Dicarboxy ester monomer | Bearing Corrosion Life (Hrs.) | Copper Strip Corrosion Test | |
|---|---|---|---|---|---|
| | | | | ½ hr. | 3 hrs. |
| None | None | | 9 | 2 | 2 |
| Example 1 | Oleyl fumarate | 1:4.5 | 18 | | 3 |
| Example 2 | Oleyl itaconate | 1:2.7 | 30 | | 3 |
| Example 3 | Lorol B fumarate | 1:4 | 24 | 2 | 2 |
| Example 4 | Lorol B maleate vinyl acetate | 1:2.7 | 34 | 2 | 2 |
| Example 5 | Lorol B fumarate styrene | 1:2.7 | 34 | 2 | 2 |

Example 8.—Pour point tests

The standard ASTM pour point test was applied to blends of the products of Examples 1 to 5 in four different mineral lubricating oils. These base oils were: (A) a blend of 92% by volume of a Mid-Continent neutral oil and 8% bright stock, solvent extracted to produce an oil of SAE 20 grade; (B) a blend of 92% by volume of a Mid-Continent neutral oil and 8% bright stock, solvent extracted to produce an oil of SAE 10 grade, 46.1 seconds viscosity (Saybolt) at 210° F. and 103 viscosity index; (C) a conventionally refined Pennsylvania neutral oil of 45.3 seconds viscosity (Saybolt) at 210° F. and 100 viscosity index; and (D) a blend of 96.5% of a conventionally refined Mid-Continent neutral oil of 46.2 seconds viscosity (Saybolt) at 210° F. and 3.5% of bright stock, the blend having a viscosity of 43.6 seconds at 210° F. and 95.0 viscosity index. Tests were made of blends containing 0.25% of active ingredient of the products in oil A and 0.1% and 0.2% each of the active ingredient of the products in each of the other three base oils described above, except that in the case of the product of Example 3, no test was made of a blend containing 0.1% of additive. The results of these tests are shown in Table II which follows:

fractions and coal tar or shale oil distillates may also be used. Also, for special applications, animal, vegetable or fish oils or their hydrogenated or volatilized products may be employed in admixtures with mineral oils.

For the best results the base stock chosen

TABLE II

| Additive Preparation | Ester or Ester Mixture Polymerized and Treated with $P_2S_5$ | ASTM Pour Points | | | | | |
|---|---|---|---|---|---|---|---|
| | | Base Oil A (°F.) (0.25%) | Base Oil B (°F.) | | Base Oil C (°F.) | | Base Oil D (°F.) | |
| | | | 0.1% | 0.2% | 0.1% | 0.2% | 0.1% | 0.2% |
| None | | +20 | +20 | +20 | +5 | +5 | +30 | +30 |
| Example 1 | Oleyl-"Loral B" fumarate | | −25 | −30 | −25 | −30 | −25 | −25 |
| Example 2 | Oleyl itaconate | −10 | −5 | −25 | −10 | −15 | +15 | +25 |
| Example 3 | "Loral B" fumarate | −15 | −10 | −20 | −15 | −35 | −15 | −20 |
| Example 4 | "Loral B" maleatevinyl acetate | −15 | −20 | −25 | −25 | −35 | −15 | −30 |
| Example 5 | "Loral B" fumarate-styrene | +5 | −15 | −25 | −15 | −25 | +30 | +30 |

*Example 9.—Viscosity index tests*

The Saybolt viscosities at 100° and 210° F., and the Dean and Davis viscosity index were determined with respect to a base oil blend consisting of 94% of a solvent extracted Mid-Continent oil and 6% bright stock, the blend having a viscosity (Saybolt) of 45.8 seconds at 210° F., and with respect to blends of this base oil with each of the products of Examples 2, 4 and 5 in amounts giving 5% of active ingredient. The results are shown in Table III which follows:

TABLE III

| Additive Preparation | Ester or Ester Mixture Polymerized and Treated with $P_2S_5$ | Viscosity Saybolt, 100° F. | Viscosity Saybolt, 210° F. | Viscosity Index |
|---|---|---|---|---|
| None | None | 174.9 | 45.8 | 113 |
| Example 2 | Oleyl itaconate | 255.3 | 54.4 | 130 |
| Example 4 | "Loral B" maleatevinyl acetate | 251.2 | 55.4 | 136 |
| Example 5 | "Loral B" fumaratestyrene | 252.1 | 54.8 | 133 |

The product of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, phosphites, thiophosphates and thiophosphites, guanidine salts, metal xanthates and thioxanthates, metal thiocarbamates, and the like. Other types of additives, such as phenols and phenol sulfides, may also be present.

The lubricating oil base stocks used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils such as polyester or polyglycol type oils or those prepared, for example, by the polymerization of olefins or by the reaction of oxides of carbon with hydrogen or by the hydrogenation of coal or its products. In certain instances cracking coil tar fractions and coal tar or shale oil distillates may also be used. Also, for special applications, animal, vegetable or fish oils or their hydrogenated or volatilized products may be employed in admixtures with mineral oils.

For the best results the base stock chosen should normally be an oil which with the new additive present gives the optimum performance in the service contemplated. However, since one advantage of the additives is that their use also makes feasible the employment of less satisfactory oils, no strict rule can be laid down for the choice of the base stock. The additives are normally sufficiently soluble in the base stock, but in some cases auxiliary solvent agents may be used. The lubricating oils will usually range from about 35 to 150 seconds Saybolt viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, antioxidants, thickeners, viscosity index improvers, oiliness agents, resins, rubber, olefin polymers, and the like.

Assisting agents which are particularly desirable as plasticizers and deformers are the higher alcohols having preferably 8–20 carbon atoms, e. g., octyl alcohol, lauryl alcohol, stearyl alcohol, and the like.

What is claimed is:

1. A mineral lubricating oil containing dissolved therein 0.01 to 15% by weight of a product obtained by reacting a combination of the elements phosphorus and sulfur selected from the group consisting of sulfides of phosphorus and mixtures of elemental sulfur and phosphorus with a polymeric material of molecular weight from about 1000 to about 50,000, selected from the group consisting of (1) polymers of an ester of a dicarboxylic acid which contains a double bond in an $\alpha,\beta$ position and which contains a total of two to four carbon atoms exclusive of the carboxyl groups, such ester having as esterifying groups aliphatic hydrocarbon radicals each containing 6 to 22 carbon atoms, the average number of carbon atoms in the radicals being 8 to 18, and (2) copolymers of an ester so defined and a compound of the formula

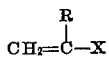

where R is a member of the group consisting of hydrogen and methyl radicals and where X is a member of the group consisting of (1) fatty acid radicals containing alkyl radicals of 2 to 18 carbon atoms, (2) aryl radicals, and (3) aryl radicals having at least one alkyl side chain, such side chain containing not more than four carbon atoms, such copolymer being prepared from a mixture containing at least 25%, on a molecular basis, of at least one dibasic acid ester of the type defined above, said reaction being carried out at a temperature in the range of about 200° to about 500° F. with an amount in the range of about 1 to 25% by weight, based on said polymeric material, of said combination of said elements, the atomic ratio of phosphorus to sulfur in said combination being in the range of about 1:1 to 1:30.

2. A composition according to claim 1 in which the sulfide of phosphorus is phosphorus pentasulfide.

3. A composition according to claim 1 in which all of the polymeric material is a polymerized ester of an $\alpha,\beta$-unsaturated dibasic carboxylic acid and a monohydric aliphatic alcohol.

4. A composition according to claim 3 in which the combination of the elements phosphorus and sulfur is phosphorus pentasulfide.

5. A mineral oil containing dissolved therein 0.01 to 15% by weight of a product obtained by reacting phosphorus pentasulfide with a polymer of an ester of an acid selected from the group consisting of fumaric and maleic acids and a monohydric aliphatic alcohol, said polymer having a molecular weight in the range of about 1000 to about 50,000 and said reaction being carried out at a temperature in the range of 200° to 500° F. with an amount in the range of 1 to 25% by weight, based on said polymer, of said phosphorus pentasulfide.

6. A composition according to claim 5 in which the ester is an ester of a mixture of $C_{10}$–$C_{18}$ primary alcohols.

7. A mineral lubricating oil containing dissolved therein 0.01 to 15% by weight of the product obtained by reacting phosphorus pentasulfide with a polymer of oleyl itaconate, said polymer having a molecular weight from about 1,000 to about 50,000, said reaction being carried out at a temperature in the range of about 200° to 500° F. with an amount in the range of about 1 to 25% by weight, based on said polymer, of said phosphorus pentasulfide.

8. A mineral lubricating oil containing dissolved therein 0.01 to 15% by weight of the reaction product of $P_2S_5$ and a copolymer of an ester of maleic acid and a mixture of $C_{10}$–$C_{18}$ primary alcohols and vinyl acetate, said copolymer having a molecular weight from about 1,000 to about 50,000, said reaction being carried out at a temperature in the range of about 200° to 500° F. with an amount in the range of about 1 to 25% by weight, based on said polymer, of said phosphorus pentasulfide.

9. A mineral lubricating oil containing dissolved therein 0.01 to 15% by weight of the reaction product of $P_2S_5$ and a copolymer of an ester of fumaric acid and a mixture of $C_{10}$–$C_{18}$ primary alcohols and styrene, said copolymer having a molecular weight from about 1000 to about 50,000, said reaction being carried out at a temperature in the range of about 200° to 500° F. with an amount in the range of about 1 to 25% by weight, based on said polymer, of said phosphorus pentasulfide.

10. A composition consisting essentially of a mineral lubricating oil and an additive as defined in claim 1, the amount of said additive in the composition being 25 to 50% by weight.

11. A composition consisting essentially of a mineral lubricating oil and an additive as defined in claim 8, the amount of said additive being 25 to 50% by weight.

12. As a new composition of matter a product obtained by reacting a combination of the elements phosphorus and sulfur selected from the group consisting of sulfides of phosphorus and mixtures of elemental sulfur and phosphorus with a polymeric material of molecular weight from about 1000 to about 50,000, selected from the group consisting of (1) polymers of an ester of a dicarboxylic acid which contains a double bond in an $\alpha,\beta$ position and which contains a total of two to four carbon atoms exclusive of the carboxyl groups, such ester having as esterifying groups aliphatic hydrocarbon radicals each containing 6 to 22 carbon atoms, the average number of carbon atoms in the radicals being 8 to 18, and (2) copolymers of an ester so defined and a compound of the formula

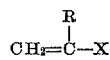

where R is a member of the group consisting of hydrogen and methyl radicals and where X is a member of the group consisting of (1) fatty acid radicals containing alkyl radicals of 2 to 18 carbon atoms, (2) aryl radicals, and (3) aryl radicals having at least one alkyl side chain, such side chain containing not more than four carbon atoms, such copolymer being prepared from a mixture containing at least 25%, on a molecular basis, of at least one dibasic acid ester of the type defined above, said reaction being carried out at a temperature in the range of about 200° to about 500° F. with an amount in the range of about 1 to 25% by weight, based on said polymeric material, of said combination of said elements, the atomic ratio of phosphorus to sulfur in said combination being in the range of about 1:1 to 1:30.

13. A composition according to claim 12 in which the combination of the elements phosphorus and sulfur is phosphorus pentasulfide.

14. As a new composition of matter a product obtained by reacting phosphorus pentasulfide with a polymer of an ester of an $\alpha,\beta$-unsaturated dibasic carboxylic acid and a monohydric aliphatic alcohol, said polymer having a molecular weight of from about 1,000 to 50,000, said reaction being carried out at a temperature in the range of about 200° to 500° F. with an amount in the range of about 1 to 25% by weight, based on said polymer, of said phosphorus pentasulfide.

15. As a new composition of matter a composition according to claim 14 in which the $\alpha,\beta$-unsaturated dibasic acid is selected from the group consisting of fumaric acid and maleic acid.

16. As a new composition of matter the product obtained by reacting phosphorus pentasulfide with a polymer of an ester of fumaric acid and a mixture of $C_{10}$–$C_{18}$ primary alcohols, said polymer having a molecular weight of about 1,000 to about 50,000, said reaction being carried out at a temperature in the range of about 200° to 500° F. with an amount in the range of about 1 to 25% by weight, based on said polymer, of said phosphorus pentasulfide.

17. As a new composition of matter the product obtained by reacting phosphorus pentasulfide with a polymer of oleyl itaconate, said polymer having a molecular weight of about 1,000 to about 50,000, said reaction being carried out at a temperature in the range of about 200° to 500° F. with an amount in the range of about 1 to 25% by weight, based on said polymer, of said phosphorus pentasulfide.

18. As a new composition of matter the product obtained by reacting phosphorus pentasulfide with a copolymer of an ester of maleic acid and a mixture of $C_{10}$–$C_{18}$ primary alcohols and vinyl acetate, said copolymer having a molecular weight of about 1,000 to about 50,000, said reaction being carried out at a temperature in the range of about 200° to 500° F. with an amount in the range of about 1 to 25% by weight, based on said polymer, of said phosphorus pentasulfide.

19. As a new composition of matter the product obtained by reacting phosphorus pentasulfide with a copolymer of an ester of fumaric acid and a mixture of $C_{10}$–$C_{18}$ primary alcohols and styrene, said copolymer having a molecular weight of about 1,000 to about 50,000, said reaction being carried out at a temperature in the range of about 200° to 500° F. with an amount in the range of about 1 to 25% by weight, based on said polymer, of said phosphorus pentasulfide.

JEFFREY H. BARTLETT.

References Cited in the file of this patent

UNITED STATES PATENTS

| Number | Name | Date |
| --- | --- | --- |
| 2,316,085 | Kelso et al. | Apr. 6, 1943 |
| 2,357,346 | Musselman et al. | Sept. 5, 1944 |
| 2,399,243 | Musselman | Apr. 30, 1946 |
| 2,441,587 | Musselman | May 18, 1948 |
| 2,483,571 | Brennan | Oct. 4, 1949 |
| 2,560,588 | Munday et al. | July 17, 1951 |
| 2,562,776 | Cyphers et al. | July 31, 1951 |